United States Patent

[11] 3,538,939

[72] Inventors Ralph J. Hoffman;
Allen D. Sheakley, Butler, Pennsylvania
[21] Appl. No. 750,651
[22] Filed Aug. 6, 1968
[45] Patented Nov. 10, 1970
[73] Assignee Armco Steel Corporation
Middletown, Ohio
a corporation of Ohio

[54] WATER JACKETED, ACID CONTAINING VESSELS
6 Claims, 1 Drawing Fig.
[52] U.S. Cl. .................................................. 137/264,
137/375
[51] Int. Cl. ................................................. B65d 87/00
[50] Field of Search ........................................ 137/264,
260, 375, 593, consulted Klinksiek, 312, 340

[56] References Cited
UNITED STATES PATENTS
1,258,479 3/1918 Shelly ........................... 137/340X 1,274,748 8/1918 Nielsen ........................... 137/375X
2,152,956 4/1939 Etzkorn ........................... 137/375X
3,110,157 11/1963 Radd ............................... 137/312

*Primary Examiner*—M. Cary Nelson
*Assistant Examiner*—Robert J. Miller
*Attorney*—Melville, Strasser, Foster and Hoffman ABSTRACT: Tanks, pipes and other vessels normally containing acids or other corrosive liquids are provided with an outer shell which, in cooperation with the vessel it surrounds, forms a space which is filled with water or other suitable fluid. The fluid within the space created by the outer shell, that is, the jacket, is maintained under a pressure which is greater than that of the liquid within the vessel itself. Should a pinhole leak or the like occur in the vessel wall it will immediately be prevented from getting any larger by reason of the fact that the fluid in the jacketed area will flow into the vessel rather than will the liquid within the vessel continue to flow out.

Patented Nov. 10, 1970
3,538,939
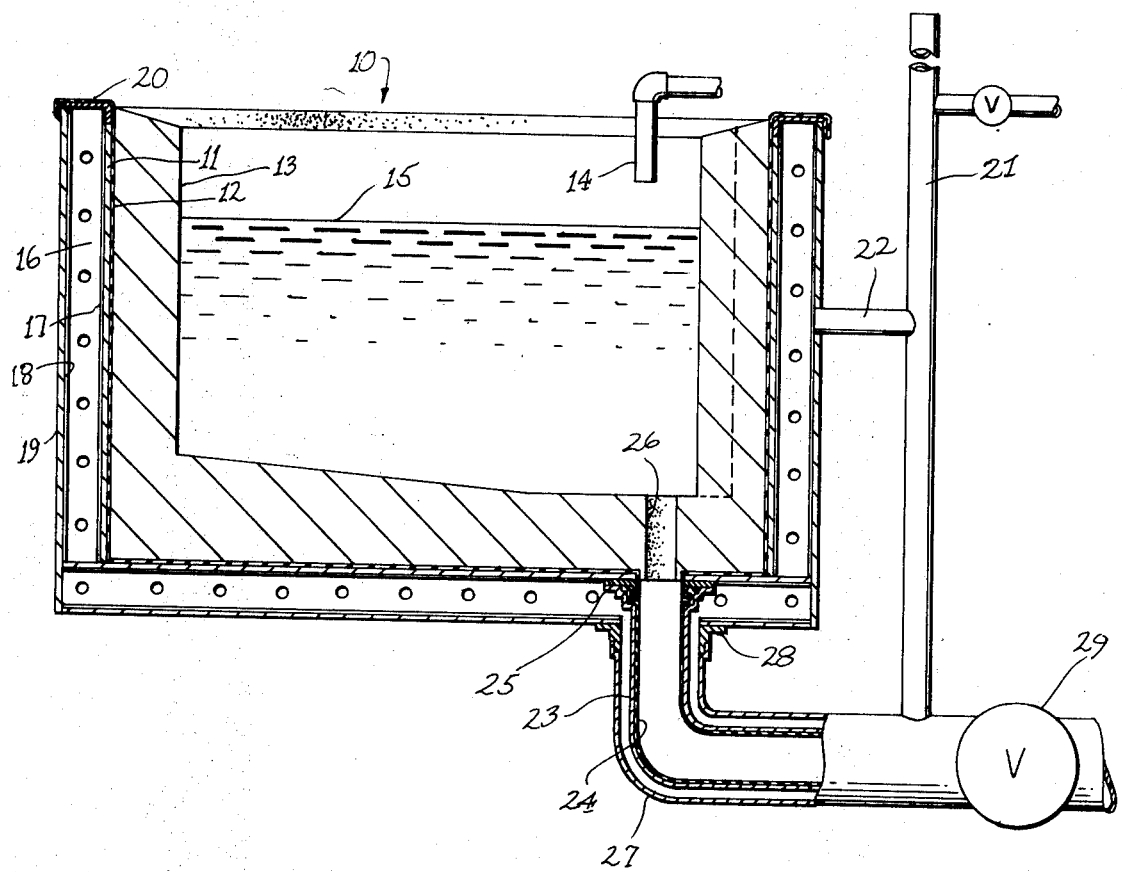
INVENTOR/S
RALPH J. HOFFMAN &
ALLEN D. SHEAKLEY
BY Melville, Strasser, Foster and Hoffman
ATTORNEYS

WATER JACKETED, ACID CONTAINING VESSELS

BACKGROUND OF THE INVENTION

1. Field of the Invention

This invention has specific application to pickle tanks such as are used in the steel industry. These tanks are often part of a continuous multioperation treatment line and a tank failure would shut down the entire operation. The invention also has direct application to the acid carrying pipes and other vessels which are in continuous communication with the acid contained in the tank.

2. Description of the Prior Art

At the outset it should be noted that no search has been made either of the patent art or other printed literature.

Pickle tanks of the type to which this invention has application are fabricated from carbon steel and lined with rubber, plastic or the like. Inside the tank, a layer of brick is placed on the liner to protect it from mechanical damage and to provide thermal insulation. In spite of this construction it is not unusual for a leak to develop. In the past there was no such thing as a "slow leak"; once a pinhole appeared, the acid running down the outside of the tank would cut a destructive groove in the steel in short order. This problem is solved by the instant invention.

Another problem inherent in prior art tanks of the type briefly described above is that of damage due to rapid thermal expansion or contraction of the tank shell when the tank is drained and refilled with fresh, cold liquid. This problem is also solved by the instant invention.

Another problem solved by this invention is that of damage to the rubber lining caused by hot spots which develop in specific areas such as, for example, those adjacent to submerged steam jets or spargers.

SUMMARY OF THE INVENTION

The above described problems are solved by surrounding the tank, pipe or other vessel with a jacket the top of which is sealed and fitted with a few valves to vent air from the jacket when it is filled with an appropriate fluid. Pressure is maintained on the fluid within the jacket so that a static head is established which exceeds the pressure of the liquid in the tank. By this arrangement leaks will not be a problem because the pressurized fluid within the jacket will flow into the tank through the pinholes as they occur and thus prevent further damage.

In addition to being tolerant of small, pinhole like leaks, the cooling effect of the water jacket prevents local overheating of the rubber liner and thereby minimizes the chances for liner failure. Such local overheating is transferred by convection throughout the mass of the jacketed fluid (normally water).

As above generally indicated, the water volume made possible by the jacket provides a heat reservoir which will prevent rapid thermal expansion or contraction of the tank shell proper, even if the tank is drained and refilled with cold solution or liquid (normally acid).

Neatly capsuled, therefore, the gist of the invention is to surround an acid containing tank with water under pressure so that should a pinhole appear in the tank, water will immediately flow into the tank through this pinhole rather than will acid flow out of the tank through such pinhole whereby catastrophic leaking of acid from the tank is prevented.

The objects of the invention are to solve the aforementioned problems in the manner generally indicated above. A more detailed description of the invention follows.

BRIEF DESCRIPTION OF THE DRAWING

The single FIG. disclosing this invention comprises what is largely a cross-sectional view of a pickle tank to which the invention has been applied, parts being broken away and other being shown schematically.

DESCRIPTION OF THE PREFERRED EMBODIMENTS

Although the preferred embodiments, about to be described, of this invention constitute a jacketed pickle tank for use in the steel making industry and a jacketed, acid carrying pipe associated with such tank, it is to be understood, and this should be evident to those skilled in this art, that the invention may have broader application than in the specific areas to be described. The description, therefore, although preferred, is also exemplary in nature.

The basic tank construction is conventional; such tank is generally indicated at 10. The tank shell 11 is fabricated from carbon steel and provided with a rubber or plastic liner 12. A layer of brick 13 is placed within the tank on the liner to protect it from mechanical damage and to provide some thermal insulation. Acid or other corrosive liquid is introduced within the tank by means of conventional piping 14 which may be plastic lined. Pipe 14 constitutes the supply line which feeds liquid into the tank above the normal level of liquid maintained in the tank. Such liquid is indicated at 15. It should here be noted that this pipe 14 need not have the jacket of this invention applied thereto for the reason that the acid supply system is intermittently operated and any leaks in this system can be easily repaired or pipe sections replaced while the pickling operation continues.

The steel tank shell 11 is supported by a series of I-beams 16 to which it is fastened. Such beams are illustrated as having flanges 17 and 18, the shell 11 being fastened to the flange 17. All of the side walls and horizontal bottom wall are similarly supported.

The outer steel shell or jacket 19 which constitutes a vital part of this invention is secured to the flanges 18 of these I-beams 16. This may be accomplished by plug welding or other conventional means. This jacket 19, therefore, actually constitutes an outer tank formed by attaching a steel skin to the structural steel supporting the main tank 11. The supporting I-beams 16 are provided with a series of perforations 20 to permit the flow of fluid, usually water, contained within the closed space created by the shell 11 and jacket 19.

The jacket 19 is pressurized and to this end suitable closure means, generally indicated at 20, are provided between the tank shell 11 and jacket shell 19. Such closure means 20 may be provided with a few valves (not shown) to vent air from the jacket when it is filled. Although air retained in the jacket will not effect the pressure obtained, it is desirable to have a sealed, air-free system to minimize corrosion by limiting oxygen availability. Pressure within the jacket is maintained by a stand pipe generally indicated at 21 so that a static head is established which exceeds the pressure of the liquid in the tank. Considering the tank liquid 15 to be acid, and the fluid within the jacket 19 to be water, it is necessary to have an elevated stand pipe because acid is more dense than water and the desired pressure differential at the bottom of the tank 11 must be maintained. The stand pipe 21 is connected directly to the jacket 19 by means of one or more branch pipes 22. Preferably a plurality of these inputs 22 are provided so that pressure is immediately available to replenish the water supply at any point in the jacketed system.

It will be apparent that other methods of pressurizing the jacket could be utilized. For example, the jacket could be connected to source of compressed air or ordinary water system pressures. It would also be desirable to add corrosion inhibitors to the fluid in the jacket if the pressurizing system is such that oxygen is made available to the pressurizing water.

An acid drain line 23 leads from the bottom of the tank shell 11. This drain line or pipe 23 is provided with a liner 24. The pipe 23 is secured by means generally indicated at 25 to the bottom of the tank shell 11 so as to receive acid passing through the passageway 26 provided in the brick 13. The drain line 23 is jacketed in a manner similar to that applied to the tank 11 and to this end an outer pipe 27 is provided so as to surround the pipe 23 and create a fluid receiving area which is in direct communication with the fluid receiving area defined by the jacket 19. The jacket 27 is secured to the jacket 19 by means generally indicated at 28. The stand pipe 21 may be connected directly to the pipe jacket 27. This connection occurs between the passageway 27 for the tank 11 and the first valve means schematically illustrated at 29.

As illustrated, therefore, the drain from the bottom of the tank is water-jacketed in common with the tank down to the first valve means 29. Since the entire water jacketing system is a continuous one, as illustrated, it is possible that one stand pipe could provide the necessary pressure for the entire system. As earlier indicated, however, it is preferred to provide multiple inputs to insure that suitable pressure is available to replenish the water supply at any point in the system.

The foregoing describes two of the preferred embodiments of this invention, namely, a jacketed tank and a jacketed pipe. It is contemplated that the tank and pipe will maintain and carry acid and that the fluid within the jackets 19 and 27 will be filled with a supply of water under pressure sufficient that should a pinhole leak occur either in the tank shell 11 or pipe 23 it will immediately be stopped by the flow of the pressurized water thereinto from the jacket system 19, 27. The pinhole leaks are thus prevented from growing and catastrophic leaking is thereby prevented.

With particular regard to pickling operations as carried out in the steel industry, pickle tanks and pipes provided with the pressurized water jacket of this invention will not have to be shut down upon the occurrence of pinhole leaks. These leaks will be repaired only when the line is down or when the tank is being repaired for some other defect; the leaks per se should never cause a shut down. Thus, as a practical matter, leakage of water into the acid bath 15 will cause dilution of the acid and, if an excess amount of water leaks into the bath through the pinhole leaks aforementioned, this could have an effect on pickling efficiency. In a continuous pickling operation such as this, however, there is always some acid loss due to the acid carried out by the strip as it leaves the acid tank 11 and there is some periodic flushing of spent pickling solution from the tank. Normally such acid loss is made up by replenishing the tank with additional acid and water as necessary. By the arrangement of this invention, however, part of the water requirement for such a replenishing operation would be met by the leakage of water into the bath through the pinholes just mentioned.

If the leakage should take place to such an extent that acid must frequently be added, there may be a time at which these leaks should be repaired. By reason of this invention, however, the leakage problem in a tank of this type will never cause an emergency type repair but will merely be dictated by economics. Thus the tank will still be operable even though it may be necessary to add acid more frequently than is desirable.

When the tank 11 is emptied, it will almost always be for reasons other than the occurrence of pinhole leaks, provided the tank is equipped with the water jacket of this invention. When the pinhole leaks are to be repaired, the patching technique is the same as has been used before. The steel tank is patched with a steel welded patch, the rubber layer is patched with a vulcanized rubber seal, and the brick is replaced.

In addition to the advantages stemming from this invention as set forth above, it is also possible to circulate the water within the jackets 19, 27 to the point where tank shell temperature is controlled at any desired value to protect organic linings or control exothermic chemical reaction in the bath. This can very well lead to a thinner brick wall, since the thickness of this is determined by the thermal gradient expected. This in turn will lead to a distinct savings in cost, a savings which may more than offset the extra cost of the steel shell comprising the jacket 19. It will be understood that a corrosion resistant material such as stainless steel may be used for the tank walls although this has not been necessary in most cases.

Although the invention has been described with particular reference to its application to a pickling system as utilized in the steel industry, noting further that the invention has been described as specifically applied to an acid containing pickle tank and drain line therefrom, it will be apparent to those skilled in the art that this invention may have wider application. It will also be apparent that modifications may be made in this invention without departing from the scope and spirit thereof. This invention, therefore, is not to be limited to specific structures and arrangements except insofar as these are explicitly set forth in the subjoined claims.

We claim:

1. Apparatus for checking the growth of leaks in the walls of vessels containing corrosive liquids at the pinhole stage, said apparatus comprising a shell fixed to and spaced from the vessel so as to comprise a fluid containing jacket, said shell being impervious to relatively noncorrosive fluid, and a supply of noncorrosive fluid in said jacket, the level of said noncorrosive fluid within said jacket being at least as great as the level of corrosive liquid within said vessel, said noncorrosive fluid within said jacket being under a pressure head which exceeds the pressure of the corrosive liquid within the vessel, whereby when a pinhole leak occurs in the wall of the vessel as caused by the corrosive liquid therewithin this pinhole leak will be prevented from getting larger by reason of the noncorrosive fluid flowing into the vessel from the jacket through the pinhole leak so as to prevent further escape of corrosive liquid from the vessel via the pinhole leak.

2. In a carbon steel pickle tank lined with rubber having a layer of carbon brick thereon and the tank containing a quantity of acid, the improvement which comprises: a steel shell fixed to and spaced from the outside of said tank so as to constitute a water containing jacket, a supply of water in said jacket, the level of water in said jacket being at least that of the level of acid within said tank, and means for maintaining pressure on the water greater than the pressure of the acid within the tank, whereby should the acid cause a pinhole leak in the steel tank, water will flow through such leak into the tank so as to prevent escape of acid through said pinhole leak.

3. The improvement of claim 2 wherein the means for maintaining said pressure comprises a stand pipe connected to said jacket.

4. The apparatus of claim 2 wherein there is a drain through the bottom of the tank and a plastic lined drain pipe connected to said tank so as to receive acid exiting the tank via said drain, and including a further improvement wherein said drain pipe is surrounded by another pipe so as to form a jacket thereabout to contain water, water within said last mentioned jacket, and means to maintain this last mentioned water at a pressure greater than the pressure of the acid within the drain pipe.

5. The apparatus of claim 4 further improved by providing a connection between the two jackets so that they are in direct water communication with each other, and the means to maintain the pressures comprises a stand pipe connected to at least one of the said jackets.

6. The improvement of claim 5 wherein said stand pipe has a plurality of connections to said jackets, at least one of said connections being to the jacket for said tank and at least one of said connections being to the jacket for said drain pipe.